UNITED STATES PATENT OFFICE.

ANDREW GORDON FRENCH, OF NELSON, BRITISH COLUMBIA, CANADA.

PROCESS FOR THE TREATMENT OF REFRACTORY ZINC-LEAD ORES.

1,041,060.  Specification of Letters Patent.  Patented Oct. 15, 1912.

No Drawing.  Application filed September 30, 1911. Serial No. 652,047.

*To all whom it may concern:*

Be it known that I, ANDREW GORDON FRENCH, citizen of the Dominion of Canada, residing at Nelson, in the Province of British Columbia, Canada, have invented a new and useful Process for the Treatment of Refractory Zinc-Lead Ores, of which the following is a specification.

This invention has for its object the treatment of refractory complex zinc-lead ores, such as are not amenable satisfactorily to the ordinary methods of treatment by concentration and smelting as difficulty is experienced in separating the zinc from the lead.

The essential feature of this improved treatment lies in the conversion of all the zinc into sulfates in which form they are soluble in water and can be satisfactorily separated from the lead by lixiviation. This conversion into sulfates is effected by the association under favorable conditions of heat, of the roasted or calcined ore with bisulfate of sodium or "niter cake" which material is of small commercial value being practically a waste product in the manufacture of sulfuric and nitric acid.

The ore is first roasted or calcined to drive off the excess of sulfur, and while by this roasting a considerable amount of the zinc may be converted into soluble sulfate of zinc, a large proportion of it is in the form of oxid of zinc and ferrate of zinc, which are insoluble in water. It is for the conversion of these two last insoluble forms of zinc into soluble sulfates that is the object of the treatment hereinafter described, as in its soluble form the zinc may be readily separated by lixiviation from the sulfate of lead, which is insoluble.

The practice of the process is as follows: The bisulfate of sodium is broken up and crushed and is then mixed with the calcined ore in the proportion of from five to fifteen per cent. of bisulfate of sodium to the original weight of the ore, that is, the weight of the ore before it is calcined. This mixture is then brought to a dull, red heat in a reverberatory furnace.

In practice the pulverized bisulfate of sodium is added to the calcined ore in the same furnace in which that ore has been calcined after the calcining has been effected. Reaction at once occurs in the furnace and the temperature rises in a few minutes to a bright red heat consequent on such reaction. It must be noted that the product is not at any time melted or fused but retains its condition as a loose disintegrated powder. The product is then withdrawn from the furnace and after being allowed to partially cool is washed in water to which a small proportion of the bisulfate of sodium has been added. The water dissolves the sulfate of zinc and separates it from the sulfate of lead and basic sulfate of iron which are not soluble in water.

The addition of the small proportion of bisulfate of sodium to the water by which the product is washed converts any small quantities of the zinc into sulfates which might possibly have escaped the previous treatment of conversion in the reverberatory furnace, and insures complete recovery of the metal values. The zinc may be recovered from the solution by any suitable process, such as electrolytic treatment. The principle of the process lies in the conversion of all the zinc values into soluble sulfates so as to be separable from the lead by washing.

As previously explained, the preliminary calcining of the ore, although it drives off the excess of sulfur leaves a quantity of zinc in the form of oxids and ferrates, and the exposure of these in the reverberatory furnace in association with the bisulfate of sodium converts them into soluble sulfates.

Although the process has been described as for the recovery of zinc values, it will obviously cover the recovery of such metals as manganese, which in these refractory ores is commonly associated with the zinc and will form a valuable by-product in the treatment. In many cases the value of the manganese will exceed that of the zinc. The metals are, however, simultaneously recoverable by the same treatment.

The process as described is an exceedingly simple, economical and effective one enabling values to be derived from ores, which are unattainable by any known treatment.

Having now particularly described my invention and the detail particulars of the treatment, I hereby declare that what I claim as new and desire to be protected in by Letters Patent, is:

1. A process for the separation of zinc and manganese from complex ores, which comprises mixing the roasted ore with bisulfate of sodium in a reverberatory furnace, and applying heat thereto to assist the reaction, maintaining the heat of the mixture below the sinter forming point, and separating the resulting sulfate by lixiviation.

2. The process of separating zinc from complex ores which resides in calcining the ore, mixing the same with pulverized bisulfate of sodium, applying sufficient heat to the mass to start the reaction, retaining said mass in its loose or disintegrate, powdery form, and then cooling the mass and lixiviating the same to dissolve out the soluble sulfates.

3. The process of separating zinc from complex ores which resides in calcining the ore, mixing the same with pulverized bisulfate of sodium, applying sufficient heat to the mass to start the reaction, retaining said mass in its loose or disintegrate, powdery form, and then cooling the mass and washing the same with water containing a small proportion of bisulfate of sodium.

4. The process of separating the metals in complex ores by heating 100 parts of the ore with from 5 to 15 parts of niter cake, maintaining the heat of reaction below the sinter forming or agglomeration point, and subsequently lixiviating the mass to recover the soluble sulfate.

5. The process of separating zinc and manganese from complex ores which resides in first roasting the ore to drive off the excess of sulfur, then adding to the mass crushed bisulfate of sodium in the proportion from 5 to 15 per cent. of bisulfate of sodium to the original weight of the ore before it has been calcined, then applying heat to the mixture to bring the mass to a dull red heat at a temperature below the sinter forming point, and subsequently recovering the soluble sulfates formed by the reaction, by lixiviation.

6. The process of separating zinc and manganese from complex ores which resides in first roasting the ore to drive off the excess of sulfur, then adding to the mass crushed bisulfate of sodium in the proportion from 5 to 15 per cent. of bisulfate of sodium to the original weight of the ore before it has been calcined, then applying heat to the mixture to bring the mass to a dull red heat at a temperature below the fusion point, and subsequently recovering the soluble sulfates formed by the resultant mass by lixiviation with water containing bisulfate of sodium.

In testimony whereof I have signed my name to this specification in the presence of two subscribing witnesses.

ANDREW GORDON FRENCH.

Witnesses:
ROWLAND BRITTAIN,
WM. S. SOUTAR.